US006495057B1

(12) United States Patent
Kasson et al.

(10) Patent No.: US 6,495,057 B1
(45) Date of Patent: Dec. 17, 2002

(54) WRINKLE REMOVING COMPOSITION AND PROCESS

(75) Inventors: Amy-Elizabeth Kasson, Ballston Spa, NY (US); Robert J. Perry, Niskayuna, NY (US); Susan A. Nye, Feura Bush, NY (US); Christine J. Phillips, Albany, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/473,758

(22) Filed: Dec. 28, 1999

(51) Int. Cl.[7] .................... D06M 15/647; C08G 77/46; C08L 83/12
(52) U.S. Cl. ................ 252/8.91; 106/287.13; 106/287.14; 38/144; 427/393.2; 524/379
(58) Field of Search .................... 252/8.91; 106/287.13, 106/287.14; 38/144; 427/393.2; 524/379

(56) References Cited

U.S. PATENT DOCUMENTS

| 3,436,772 A | | 4/1969 | Stebbins .................... 8/149.2 |
| 3,600,325 A | | 8/1971 | Kaufman et al. .......... 252/8.91 |
| 3,674,688 A | | 7/1972 | Schwartz et al. .......... 252/8.91 |
| 4,246,423 A | * | 1/1981 | Martin ....................... 556/423 |
| 4,661,268 A | | 4/1987 | Jacobson et al. .......... 252/8.91 |
| 4,800,026 A | * | 1/1989 | Coffindaffer et al. ....... 510/516 |
| 4,806,254 A | | 2/1989 | Church ....................... 510/513 |
| 4,923,623 A | * | 5/1990 | Coffindaffer ................ 510/513 |
| 5,100,566 A | * | 3/1992 | Agbomeirele et al. ..... 252/8.91 |
| 5,573,695 A | * | 11/1996 | Targosz ..................... 252/8.91 |
| 5,707,613 A | * | 1/1998 | Hill .......................... 424/78.03 |
| 5,798,107 A | * | 8/1998 | Vogel et al. ................ 424/400 |
| 5,891,954 A | * | 4/1999 | Gee et al. ................... 524/837 |

FOREIGN PATENT DOCUMENTS

| EP | 0 470613 | | 2/1992 |
| EP | 778337 | * | 6/1997 |
| EP | 893467 | * | 1/1999 |
| EP | 0 894889 | | 2/1999 |
| EP | 0 902044 | | 3/1999 |
| EP | 0 924239 | | 6/1999 |
| JP | 1201579 | * | 8/1989 |

* cited by examiner

*Primary Examiner*—Anthony J. Green
(74) *Attorney, Agent, or Firm*—Kenneth S. Wheelock

(57) ABSTRACT

A composition containing water, alcohol and a silicone surfactant containing at least one polyether substituent group per molecule is useful in treating wrinkled fabric to reduced the amount of wrinkling.

20 Claims, No Drawings

WRINKLE REMOVING COMPOSITION AND PROCESS

TECHNICAL FIELD

The present invention is directed to a composition and process for removing wrinkles from textiles and fabrics.

BACKGROUND

A variety of methods are known in the industry for removing wrinkles from garments, fabrics or textiles. Several well known methods use heat, steam and pressure such as household ironing or steam pressing. These methods are effective but suffer from the need for special equipment and may not be convenient or practical, such as, for example, when traveling. In addition, the use of heat may damage the fabric.

Compositions and methods for removing or reducing wrinkles without the need for special equipment are known. U.S. Pat. No. 3,600,325 to Kaufman, et. al. and U.S. Pat. No. 3,436,772 to Stebbins each disclose the use of mixtures of alcohol and water. U.S. Pat. No. 3,674,688 to Schwartz et. al. discloses using an alcohol/water mixture with a quatenary ammonium salt as a surfactant. U.S. Pat. No. 4,661,268 to Jacobson et. al. discloses a water/alcohol/surfactant mixture using a quaternary ammonium salt and a silicone glycol or fluorosilicone polymer as the surfactant. U.S. Pat. No. 4,806,254 to Church provides for a dewrinkle composition containing alcohol, water, non-ionic surfactant and glycerine.

SUMMARY OF THE INVENTION

The present invention is directed to a composition for removing or decreasing wrinkles from fabrics, comprising water, alcohol and a silicone surfactant containing at least one polyether substituent group per molecule.

This invention also provides for a method of treating a wrinkled fabric to reduced the amount of wrinkling, comprising contacting the fabric with an effective amount of a composition comprising water, alcohol and a silicone surfactant containing at least one polyether substituent group per molecule.

DETAILED DESCRIPTION OF THE INVENTION

As used herein, the term "fabric" is used broadly and includes woven and non-woven textiles made from natural fibers, such as for example, cotton, silk, linen or wool, man made fibers, such as for example, polyester, rayon or nylon, or combinations thereof, as well as garments or other articles, for example, window draperies, made form such materials. In a preferred embodiment, the fabric is a woven textile comprising at least one natural fiber. In a highly preferred embodiment, the fabric comprises, a garment made from a woven textile comprising at least one natural fiber.

In a preferred embodiment, the composition of the present invention comprises, based on 100 parts by weight ("pbw") of the composition, from about 75 pbw to about 98.99 pbw, more preferably from about 80 pbw to about 95 pbw and still more preferably from about 85 pbw to about 93 pbw, water, from about 1 pbw to about 20 pbw, more preferably from about 5 pbw to about 15 pbw and still more preferably from about 8 pbw to about 12 pbw, of the alcohol, and from 0.01 pbw to about 5 pbw, more preferably from about 0.03 pbw to about 3 pbw and still more preferably from about 0.05 pbw to about 2 pbw, of the silicone surfactant.

The alcohol may be any alcohol that sufficiently volatile to evaporate at room temperature. In a preferred embodiment, the alcohol comprises a linear or branched alcohol containing from 2 to 6 carbon atoms per molecule. More preferably, the alcohol comprises one or more of ethanol, propanol and isopropanol.

In a preferred embodiment, the silicone surfactant comprises a compound having one or more units of the structural formula (I):

$$R_a SiO_{4-a/2} \qquad (I)$$

wherein each R is independently a monovalent hydrocarbon radical or a monovalent polyether radical, provided that at least one R per molecule of the silicone surfactant is a monovalent polyether radical and a is a number wherein $1 \leq a \leq 4$.

Suitable monovalent hydrocarbon radicals include monovalent acyclic hydrocarbon radicals, monovalent alicyclic hydrocarbon radicals and monovalent aromatic hydrocarbon radicals.

As used herein, the terminology "monovalent acyclic hydrocarbon radical" means a monovalent straight chain or branched hydrocarbon radical, preferably containing from 1 to 20 carbon atoms per radical, which may be saturated or unsaturated and which may, optionally, be substituted, for example with one or more halo groups. Suitable monovalent acyclic hydrocarbon radicals include, for example, alkyl radicals, such as, for example, methyl, ethyl, sec-butyl, tert-butyl, octyl, dodecyl, stearyl and eicosyl, haloalkyl, such as trifluoropropyl, alkenyl radicals, such as, for example, ethenyl and propenyl, and alkynyl radicals, such as, for example, propynyl and butynyl.

As used herein, the terminology "alicyclic hydrocarbon radical" means a radical containing one or more saturated hydrocarbon rings, preferably containing from 6 to 10 carbon atoms per ring, per radical which may optionally be substituted on one or more of the rings with one or more alkyl groups, each preferably containing from 2 to 6 carbon atoms per group and which, in the case of two or more rings, may be fused rings. Suitable monovalent alicyclic hydrocarbon radicals include, for example, cyclohexyl and cyclooctyl.

As used herein, the terminology "monocyclic aromatic hydrocarbon radical" means a hydrocarbon radical containing one aromatic ring per radical, which may optionally be substituted on the aromatic ring with one or more alkyl groups, each preferably containing from 2 to 6 carbon atoms per group. Suitable monovalent aromatic hydrocarbon radicals include, for example, phenyl, tolyl, xylyl, 2,4,6-trimethylphenyl and naphthyl.

As used herein the term "polyether radical" means a monovalent group according to the structural formula (II):

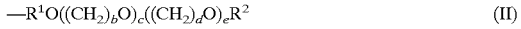

$$-R^1O((CH_2)_bO)_c((CH_2)_dO)_eR^2 \qquad (II)$$

wherein:

$R^1$ is divalent alkyl radical;

$R^2$ is H, alkyl, alkenyl, hydroxyalkyl;

b and d are each independently integers of from 1 to 12;

c and e are each independently integers of from 0 to 100; and $1 \leq c+e \leq 200$.

In a preferred embodiment, $1 \leq c \leq 50$ and $1 \leq e \leq 50$, more preferably $1 \leq c \leq 30$ and $1 \leq e \leq 30$.

In one preferred embodiment, $R^1$ is a divalent alkyl radical containing from 1 to 6 carbon atoms per radical, more preferably —$(CH_2)_3$—, b is 2, $1 \leq c \leq 100$, e is 0 and $R^2$ is H or an alkyl radical containing from 1 to 12, more preferably 1 to 6, carbon atoms per radical, more preferably H. More preferably, $1 \leq c \leq 50$, and even more preferably $2 \leq c \leq 30$.

In another preferred embodiment, $R^1$ is a divalent alkyl radical containing from 1 to 6 carbon atoms per radical, more preferably —$(CH_2)_3$—, b is 2, $1 \leq c \leq 100$, d is 3, $1 \leq e \leq 100$ and $R^2$ is H or an alkyl radical containing from 1 to 12, more preferably 1 to 6, carbon atoms per radical, more preferably H. More preferably, $1 \leq c+e \leq 100$, $1 \leq c+e \leq 50$, and even more preferably $2 \leq c+e \leq 30$.

In a preferred embodiment, the silicone surfactant comprises one or more organopolysiloxane polymers or copolymers of the structural formula (III):

$$M_a D_b T_c Q_d \quad \text{(III)}$$

wherein:

M is $R^3_3SiO_{1/2}$;

D is $R^4_2SiO_{2/2}$;

T is $R^5SiO_{3/2}$;

Q is $SiO_{4/2}$;

each $R^3$, $R^4$ and $R^5$ is independently a monovalent hydrocarbon radical or a monovalent polyether radical, provided that at least one $R^3$, $R^4$ or $R^5$ radical per molecule is a monovalent polyether radical; and a, b, c and d are each integers, wherein $a=(2+c+2d)$, $0 \leq b \leq 500$, $0 \leq c \leq 10, 0 \leq d \leq 10$.

In a preferred embodiment, each $R^3$, $R^4$ and $R^5$ is independently alkyl, more preferably $(C_1-C_6)$alkyl, even more preferably methyl, or a monovalent polyether radical.

In a preferred embodiment, c and d are each 0.

In a highly preferred embodiment, c and d are each 0, $1 \leq b \leq 4$ and at least one $R^3$ is a hydroxy endcapped poly(ethyleneoxy) radical containing from 3 to 24 ethyleneoxy units per radical.

In a highly preferred embodiment, the silicone surfactant comprises one or more linear organopolysiloxane polymers or copolymers of the structural formula (IV):

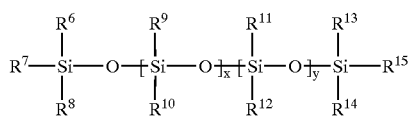

(IV)

wherein $R^6$, $R^7$, $R^8$, $R^9$, $R^{10}$, $R^{11}$, $R^{12}$, $R^{13}$, $R^{14}$, $R^{15}$ are each independently a monovalent hydrocarbon radical or a monovalent polyether radical, provided that at least one of $R^6$, $R^7$, $R^8$, $R^9$, $R^{10}$, $R^{11}$, $R^{12}$, $R^{13}$, $R^{14}$, $R^{15}$ is a monovalent polyether radical, and x and y are each integers wherein $0 \leq x \leq 500$ and $0 \leq y \leq 500$ provided that $(x+y) \geq 0$.

In a preferred embodiment, $0 \leq x \leq 100$ and $0 \leq y \leq 100$, more preferably $0 \leq x \leq 30$ and $0 \leq y \leq 30$.

In a preferred embodiment, each $R^6$, $R^8$, $R^9$, $R^{10}$, $R^{11}$, $R^{12}$, $R^{13}$, and $R^{14}$ is independently a monovalent hydrocarbon radical and each $R^7$ and $R^{15}$ is independently a monovalent polyether radical. In a more preferred embodiment, each $R^6$, $R^8$, $R^9$, $R^{10}$, $R^{11}$, $R^{12}$, $R^{13}$, and $R^{14}$ is independently $(C_1-C_6)$ alkyl, more preferably methyl, and each $R^7$ and $R^{15}$ is independently a monovalent poly(ethyleneoxy) radical.

In another preferred embodiment, y=0 and each $R^6$, $R^7$, $R^8$, $R^9$, $R^{13}$, $R^{14}$ and $R^{15}$ is independently a monovalent hydrocarbon radical and each $R^{10}$ is independently a monovalent polyether radical. In a more preferred embodiment, each $R^6$, $R^7$, $R^8$, $R^9$, $R^{13}$, $R^{14}$ is independently $(C_1-C_6)$alkyl, more preferably methyl, and each $R^{10}$ is independently a monovalent polyether radical, more preferably, a monovalent poly(ethyleneoxy) radical.

In accordance with the process of the invention, the fabric is treated by contacting the wrinkled fabric, that may be hung in the desired shape or remain on the person, with an effective amount of the above identified aqueous solution in the form a of a spray or mist of finely divided droplets to the surface of the fabric. An effective amount of the composition is one effective to reduce the wrinkling of the fabric being treated, preferably an amount sufficient to dampen the surface of the fabric without saturating the fabric. A conventional pump sprayer or suitable alternative method may be employed.

After application of the composition, the dampened article may be smoothed by hand or other device or pulled taut to enhance the dewrinkling capability of the solution and then allowed to dry.

Once the article has dried following an initial treatment, the article may, optionally, be again treated with the composition and handled as before. This results in an improved appearance over the singly treated articles.

This invention has advantages over those previously described in that the surfactant of the present invention is odorless, glycerine, which leaves a sticky residue, is not used, no deleterious effect on fabric is observed and the dewrinkling ability is improved over alcohol/water mixtures.

EXAMPLES A–T AND COMPARATIVE EXAMPLES X1–X3

The compositions of Examples A to T were made by mixing 89.0 pbw deionized water, 10.0 pbw ethanol and 1.0 pbw of one of the silicone polyether compound listed below.

| Example | Silicone polyether component |
|---|---|
| A | $MD_{20}D'_3M$, wherein $D' = R_2SiO_{2/2}$, where R = a polyethylene oxide/polypropylene oxide copolymer radical (50% ($C_2H_4O$) units, 50% ($C_3H_6O$) units), MW = 1700 |
| B | $MD_{15}D'_5M$, wherein $D' = R_2SiO_{2/2}$, where R = a poly(ethylene oxide) radical having a MW = 550 |
| C | $M'D_3M'$, wherein $M' = R_3SiO_{1/2}$, where R a poly(ethylene oxide) radical having a MW = 200 |
| D | $M'DM'$, wherein $M' = R_3SiO_{1/2}$, where R = a poly(ethylene oxide) radical with 8 (ethylene oxide) units |
| E | $M'D_{15}M'$, wherein $M' = R_3SiO_{1/2}$, where R = a poly(ethylene oxide) radical with 12 (ethylene oxide) units |
| F | $M'DM'$, wherein $M' = R_3SiO_{1/2}$, where R = a poly(ethylene oxide) radical with 3 (ethylene oxide) units |
| G | $M'D_2M'$, wherein $M' = R_3SiO_{1/2}$, where R = a poly(ethylene oxide) radical with 3 (ethylene oxide) units |
| H | $M'D_3M'$, wherein $M' = R_3SiO_{1/2}$, where R = a poly(ethylene oxide) radical with 12 (ethylene oxide) units |
| I | $M'D_{25}M'$, wherein $M' = R_3SiO_{1/2}$, where R = a poly(ethylene oxide) radical with 20 (ethylene oxide) units |
| J | $M'D_3M'$, wherein $M' = R_3SiO_{1/2}$, where R = a poly(ethylene oxide) radical with 8 (ethylene oxide) units |
| K | $M'D_5M'$, wherein $M' = R_3SiO_{1/2}$, where R a poly(ethylene oxide) radical with 4 (ethylene oxide) units |
| L | $M'D_{10}M'$, wherein $M' = R_3SiO_{1/2}$, where R = a poly(ethylene oxide) radical with 8 (ethylene oxide) units |
| M | $MD_{110}D'_5M$, wherein $D' = R_2SiO_{2/2}$, where R = - a poly(ethylene oxide) radical having a MW = 550 |
| N | $MD_{34}D'_5M$, wherein $D' = R_2SiO_{2/2}$, where R = a polyethylene |

-continued

| Example | Silicone polyether component |
|---|---|
| | oxide/polypropylene oxide copolymer radical (50% ($C_2H_4O$) units, 50% —($C_3H_6O$) units) having a MW = 1700 |
| O | $MD_{110}D'_5M$, wherein D' = $R_2SiO_{2/2}$, where R = - a poly(ethylene oxide) radical having a MW = 1500 |
| P | $MD_{34}D'5M$, wherein D' = $R_2SiO_{2/2}$, where R= - a poly(ethylene oxide) radical having a MW = 1500 |
| Q | $MD_{110}D'_5M$, wherein D' = $R_2SiO_{2/2}$, where R = 50% polyethylene oxide/polypropylene oxide copolymer radicals (50% ($C_2H_4O$) units, 50% —($C_3H_6O$) units) having a MW = 1700 and 50% poly(ethylene oxide) radicals having a MW = 550 |
| R | $MD_{110}D'_5M$, wherein D' = $R_2SiO_{2/2}$, where R = a polyethylene oxide/polypropylene oxide copolymer radical (50% ($C_2H_4O$) units, 50% —($C_3H_6O$) units) having a MW = 1700 |
| S | $MD_{110}D'_5M$, wherein D' = $R_2SiO_{2/2}$, where R = 50% polyethylene oxide/polypropylene oxide copolymer radicals (50% ($C_2H_4O$) units, 50% —($C_3H_6O$) units) having a MW = 1700 and 50% a poly(ethylene oxide) radicals having a MW = 1500 |
| T | $M'D3M'$, wherein M' = $R_3SiO_{1/2}$, where R = a poly(ethylene oxide) radical having a MW = 900 |

The composition of Comparative Example X1 was a commercially available product "Faultless® Wrinkle Remover" by Starch/Bon Ami Company.

The composition of Comparative Example X2 was made by mixing 90.0 pbw deionized water and 10.0 pbw ethanol.

The composition of Comparative Example X3 was made by mixing 89.0 pbw deionized water and 10.0 pbw ethanol and 1.0 pbw glycerin.

The American Association of Textile Colorists and Chemists("AATCC") Test Method 124-1992 was used for the evaluation of the wrinkles. The test method provides a scale for measuring wrinkling.

| Grade | Description |
|---|---|
| SA-1 | Crumpled, creased and severely wrinkled appearance |
| SA-2 | Rumpled, obviously wrinkled appearance |
| SA-3 | Mussed, non-pressed appearance |
| SA-4 | Smooth, finished appearance |
| SA-5 | Very Smooth, pressed, finished appearance |

Three different tests were performed on 12 inch×12 inch samples of cotton pinpoint Oxford cloth fabric (Textile Innovators Corporation, Windsor, N.C.). All fabric samples initially had a severely wrinkled "SA-1" appearance.

The first test protocol ("TP1") consisted of spraying a test composition on the fabric sample, hanging the fabric sample on a wire using two small metal clips, weighing the bottom corners of the fabric sample with two addition small metal clips and allowing the fabric sample to dry while hanging.

The second test protocol ("TP2") consisted of: laying the fabric sample on a table, spraying a test composition on the fabric sample until the surface of the fabric sample was slightly damp, manually pulling wrinkled area taut and then smoothing the fabric sample, hanging the fabric sample fabric on a wire to dry. The fabric sample was smoothed by applying pressure to the fabric sample using upright fists, initially together in an upright position, while moving the fists away from each other. The test composition was applied in eight passes while holding the spray applicator 6–8 inches from fabric sample, without shaking the test composition and without saturating the fabric sample. The fabric was sprayed four consecutive times from left to right, then again, spraying over the initial four sprays.

The third test protocol ("TP3") consisted of two cycles of the protocol of TP2, that is, protocol TP2 was used, the fabric sample was allowed to dry and protocol TP2 was then repeated using the same fabric sample.

Fabric samples were treated with the compositions of Examples A–T and Comparative Examples X1–X3 according to test protocol TP1. The appearance of all fabric samples, other than the fabric sample treated with the composition of Example F, remained SA-1 following the treatment. The appearance of the fabric sample treated with the composition of Example F was SA-2.

Fabric samples were treated with the compositions of Examples A–T and Comparative Examples X1–X3 according to test protocol TP2. Results of the testing are set forth in TABLE I below.

TABLE I

| Example # | Appearance after treatment according to Test Protocol TP2 |
|---|---|
| A | SA-1.5 |
| B | SA-1.5 |
| C | SA-1.5 |
| D | SA-2 |
| E | SA-1 |
| F | SA-3.5 |
| G | SA-1 |
| H | SA-3 |
| I | SA-1 |
| J | SA-3.5 |
| K | SA-1 |
| L | SA-1.5 |
| M | SA-2 |
| N | SA-3 |
| O | SA-2 |
| P | SA-1 |
| Q | SA-2 |
| R | SA-3 |
| S | SA-2 |
| T | SA-3.5 |
| X1 | SA-3.0 |
| X2 | SA-2.5 |
| X3 | SA-2.5 |

Fabric samples were treated with the compositions of Examples J and T and Comparative Example X1 according to test protocols TP2 and TP3. The results of the testing are set forth in TABLE II below.

TABLE II

| Example # | Appearance after treatment according to Test Protocol TP2 | Appearance after treatment according to Test Protocol TP3 |
|---|---|---|
| X1 | SA-3 | SA-3 |
| J | SA-3.5 | SA-4 |
| T | SA-3.5 | SA-4 |

There was a noticeable improvement in the appearance of the fabric samples treated with the compositions of Examples J and T according to protocol TP, compared to treatment according to test protocol TP2.

What is claimed is:

1. A composition for treating a wrinkled fabric, comprising a solution of water, alcohol and a silicone surfactant containing at least one polyether substituent group per molecule whereby wrinkling of the fabric is reduced.

2. The composition of claim 1, wherein the composition comprises, based on 100 parts by weight of the composition, from about 75 parts by weight to about 98.99 parts by weight water, from about 1 parts by weight to about 20 parts by weight, of the alcohol, and from 0.01 parts by weight to about 5 parts by weight of the silicone surfactant.

3. The composition of claim 1, wherein, the silicone surfactant comprises a compound having one or more units of the structural formula:

$$R_a SiO_{4-a/2}$$

wherein each R is independently a monovalent hydrocarbon radical or a monovalent polyether radical, provided that at least one R per molecule of the silicone surfactant is a monovalent polyether radical and a is a number wherein $1 \leq a \leq 4$.

4. The composition of claim 3, wherein the polyether radical comprises a monovalent group according to the structural formula:

$$—R^1O((CH_2)_bO)_c((CH_2)_dO)_eR^2$$

wherein:

$R^1$ is divalent alkyl radical;

$R^2$ is H, alkyl, alkenyl, hydroxyalkyl;

b and d are each independently integers of from 1 to 12;

c and e are each independently integers of from 0 to 100; and $1 \leq c+e \leq 200$.

5. The composition of claim 4, wherein $R^1$ is a divalent alkyl radical containing from 1 to 6 carbon atoms per radical, b is 2, $1 \leq c \leq 100$, e is 0 and $R^2$ is H or an alkyl radical containing from 1 to 12 carbon atoms per radical.

6. The composition of claim 4, wherein $R^1$ is a divalent alkyl radical containing from 1 to 6 carbon atoms per radical, b is 2, $1 \leq c \leq 100$, d is 3, $1 \leq e \leq 100$ and $R^2$ is H or an alkyl radical containing from 1 to 12 carbon atoms per radical.

7. The composition of claim 1, wherein the silicone surfactant comprises one or more organopolysiloxane polymers or copolymers of the structural formula:

$$M_a D_b T_c Q_d$$

wherein M is $R^3_3 SiO_{1/2}$, D is $R^4_2 SiO_{2/2}$, T is $R^5 SiO_{3/2}$, Q is $SiO_{4/2}$, each $R^3$, $R^4$ and $R^5$ is independently a monovalent hydrocarbon radical or a monovalent polyether radical, provided that at least one $R^3$, $R^4$ or $R^5$ radical per molecule is a monovalent polyether radical and a, b, c and d are each integers wherein $a=(2+c+2d)$, $0 \leq b \leq 500$, $0 \leq c \leq 10$, $0 \leq d \leq 10$.

8. The composition of claim 7, wherein each $R^3$, $R^4$ and $R^5$ is independently alkyl or a monovalent polyether radical.

9. The composition of claim 7, wherein c and d are each 0.

10. The composition of claim 9, wherein $1 \leq b \leq 4$ and at least one $R^3$ is a hydroxy endcapped poly(ethyleneoxy) radical containing from 3 to 24 ethyleneoxy units per radical.

11. The composition of claim 1, wherein, the silicone surfactant comprises one or more linear organopolysiloxane polymers or copolymers of the structural formula:

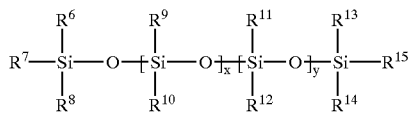

wherein $R^6$, $R^7$, $R^8$, $R^9$, $R^{10}$, $R^{11}$, $R^{12}$, $R^{13}$, $R^{14}$, $R^{15}$ are each independently a monovalent hydrocarbon radical or a monovalent polyether radical, provided that at least one of $R^6$, $R^7$, $R^8$, $R^9$, $R^{10}$, $R^{11}$, $R^{12}$ $R^{13}$, $R^{14}$, $R^{15}$ is a monovalent polyether radical, and x and y are each integers wherein $0 \leq x \leq 500$ and $0 \leq y \leq 500$ provided that $(x+y) \geq 0$.

12. The composition of claim 11, wherein $0 \leq x \leq 100$ and $0 \leq y \leq 100$.

13. The composition of claim 11, wherein each $R^6$, $R^8$, $R^9$, $R^{10}$, $R^{11}$, $R^{12}$, $R^{13}$, and $R^{14}$ is independently a monovalent hydrocarbon radical and each $R^7$ and $R^{15}$ is independently a monovalent polyether radicals.

14. The composition of claim 13, wherein each $R^6$, $R^8$, $R^9$, $R^{10}$, $R^{11}$, $R^{12}$, $R^{13}$, and $R^{14}$ is independently $(C_1-C_6)$alkyl and each $R^7$ and $R^{15}$ is independently a monovalent poly(ethyleneoxy) radical.

15. The composition of claim 11, wherein y=0, each $R^6$, $R^7$, $R^8$, $R^9$, $R^{13}$, $R^{14}$ and $R^{15}$ is independently a monovalent hydrocarbon radical and each $R^{10}$ is independently a monovalent polyether radical.

16. The composition of claim 15, wherein each $R^6$, $R^7$, $R^8$, $R^9$, $R^{13}$, $R^{14}$ is independently $(C_1-C_6)$alkyl and each $R^{10}$ is independently a monovalent poly(ethyleneoxy) radical.

17. A method of treating a wrinkled fabric to reduce the amount of wrinkling, comprising contacting the fabric with an amount of a composition effective to reduce wrinkling said composition comprising a solution of water, alcohol and a silicone surfactant containing at least one polyether substituent group per molecule.

18. The method of claim 17, wherein the fabric is contacted with the composition by applying the composition to the fabric in the form a of a spray or mist of finely divided droplets of the composition.

19. The method of claim 18, wherein an amount of the composition sufficient to dampen the surface of the fabric is applied and the dampened fabric is then smoothed or pulled taut and the smoothed or pulled fabric is then allowed to dry.

20. The method of claim 19, wherein, subsequent to allowing the fabric to dry, the steps of applying the composition, smoothing or pulling the fabric taut and allowing the fabric to dry are repeated.

* * * * *